(12) United States Patent
Dieterle et al.

(10) Patent No.: US 9,209,610 B1
(45) Date of Patent: Dec. 8, 2015

(54) RETROFIT OUTLET ELECTRICAL BOX (75) Inventors: Iven Dieterle, Tempe, AZ (US); Richard L. Cleghorn, Carlsbad, CA (US); Jeffrey P. Baldwin, Phoenix, AZ (US); Lincoln Jolley, Stansbury Park, UT (US)

(73) Assignee: Hubbell Incorporated, Shelton, CT (US)

( * ) Notice: Subject to any disclaimer, the term of this patent is extended or adjusted under 35 U.S.C. 154(b) by 587 days.

(21) Appl. No.: 13/571,312

(22) Filed: Aug. 9, 2012

Related U.S. Application Data (63) Continuation-in-part of application No. 12/553,016, filed on Sep. 2, 2009, now Pat. No. 8,269,102.

(60) Provisional application No. 61/521,476, filed on Aug. 9, 2011, provisional application No. 61/093,500, filed on Sep. 2, 2008.

(51) Int. Cl.
*H02B 1/40* (2006.01)
*H02G 3/10* (2006.01)
*H02G 3/12* (2006.01)

(52) U.S. Cl.
CPC .. *H02G 3/10* (2013.01); *H02G 3/12* (2013.01); *H02G 3/121* (2013.01); *H02G 3/123* (2013.01)

(58) Field of Classification Search
CPC .......... H02G 3/12; H02G 3/121; H02G 3/123
USPC ................................................. 174/480, 500
See application file for complete search history.

(56) References Cited

U.S. PATENT DOCUMENTS

| | | | | |
|---|---|---|---|---|
| 2,297,862 A | * | 10/1942 | Bachmann | 220/3.6 |
| 2,309,189 A | * | 1/1943 | Hancock et al. | 220/3.6 |
| 2,581,755 A | | 1/1952 | Dieffenderfer | |
| 2,658,704 A | * | 11/1953 | Smith | 248/27.1 |
| 2,757,817 A | * | 8/1956 | Egan | 220/3.5 |
| 3,963,204 A | | 6/1976 | Liss | |
| 4,012,580 A | * | 3/1977 | Arnold | 174/53 |
| 4,130,335 A | * | 12/1978 | Kinney | 439/535 |
| 4,408,696 A | | 10/1983 | Crosson | |
| 4,805,856 A | * | 2/1989 | Nicoli et al. | 248/74.3 |
| 5,434,359 A | | 7/1995 | Schnell | |
| 6,557,305 B1 | | 5/2003 | Hayes | |
| 7,105,742 B1 | | 9/2006 | Jolly | |
| 7,129,411 B2 | * | 10/2006 | Bump et al. | 174/58 |
| 7,307,212 B1 | | 12/2007 | Gretz | |
| 7,423,215 B2 | | 9/2008 | Cardenas et al. | |
| 7,855,338 B2 | | 12/2010 | Troder | |
| 2006/0131046 A1 | * | 6/2006 | Bump et al. | 174/58 |
| 2010/0084155 A1 | * | 4/2010 | Jafari | 174/58 |

\* cited by examiner

*Primary Examiner* — Timothy Thompson
*Assistant Examiner* — Rhadames J Alonzo Miller
(74) *Attorney, Agent, or Firm* — Dickinson Wright PLLC (57) ABSTRACT

A retrofit electrical outlet comprises an electrical box comprising one or more moveable braces coupled to linear brace actuators, whereby pulling on the linear brace actuator causes the brace to move toward the front end of the box to impinge a wall surface material between the brace and a front flange of the box. Releases may be included to allow for adjustment of the braces. The braces may move linearly or pivotally toward the wall surface material. The linear brace actuator may be stored within the wall for future use.

17 Claims, 9 Drawing Sheets

RETROFIT OUTLET ELECTRICAL BOX

CROSS REFERENCE TO RELATED APPLICATIONS

This document claims the benefit of the filing date of U.S. Provisional Patent Application 61/521,476 to Dieterle, et al. entitled "Zip-Box Electrical Old Work Box", which was filed on Aug. 9, 2011, the disclosure of which is hereby incorporated herein by reference.

This application is also a continuation-in-part application of the earlier U.S. Utility patent application to Baldwin, et al. entitled "Retrofit Outlet Electrical Box," application Ser. No. 12/553,016, filed Sep. 2, 2009, now U.S. Pat. No. 8,269,102, which claims the benefit of the filing date of U.S. Provisional Patent Application 61/093,500 to Baldwin, et al. entitled "Retrofit Outlet Electrical Box," which was filed on Sep. 2, 2008, the disclosures of which are hereby incorporated herein by reference.

BACKGROUND

1. Technical Field

Aspects of the present documents relate generally to electrical boxes for outlets, connectors, wires and switches, and more specifically to electrical boxes designed for coupling after a wall has been built directly to a planar wall covering material such as drywall or paneling rather than to a wall internal structure like a stud.

2. Background Art

Electrical boxes, also called box or boxes herein, are known in the art. Such conventional electrical boxes typically consist of a generally box-shaped structure that is mounted to a wall stud or other interior wall structure via one or more nails, screws, or other fastening devices. The box contains an opening for an electrical device or connector that is typically installed within the box after the box is mounted within a wall. Fastener holes are typically provided as openings in the box to allow the box to be fastened to a wall stud.

An electrical box typically includes an opening adjacent to the planar wall surface. If an electrical box needs to be installed after the wall covering has been added, a nonconventional electrical box must be used to avoid damaging the wall covering. Challenges associated with typical installation of an electrical box in an existing wall may include: locating an interior wall stud, placing the electrical box in a specific and convenient location, and then anchoring the electrical box securely in the wall without causing undesirable damage to the wall surface.

One particular prior art solution involves a rotating "flipper" that rotates from a first position flush with an outside surface of the box approximately 90 degrees to a second position in which the flipper extends perpendicularly from the outside surface of the box. By the installer turning a metal screw on the front of the box, typically with a power tool else the process is very long, the flipper moves along the outside surface of the box toward its front until the flipper contacts a back surface of the wall covering and clamps the wall covering between a front rim of the box and the flipper.

SUMMARY

Aspects of this document relate generally to safety outlets.

In one aspect, a retrofit electrical box assembly may comprise: an electrical box having at least one side wall and a back wall and an open front end defining a space within the electrical box and a front perimeter edge having at least one front flange with a rear surface and at least one moveable brace responsive to a brace actuator, the brace actuator comprising a surface engaged with a restraint on the at least one side wall of the electrical box. Linear movement of the brace actuator away from the open front end of the electrical box moves the at least one moveable brace toward the at least one front flange and moves the brace actuator through the restraint. The restraint may be configured to engage the surface of the brace actuator at any of a plurality of locations along a length of the brace actuator. The at least one movable brace may be configured to impinge a wall surface material between the at least one movable brace and the rear surface of the front flange when the electrical box is installed on the wall surface material and the linear brace actuator is pulled away from the open front end of the electrical box.

Particular implementations may include one or more of the following: The surface of the brace actuator may comprise a serrated surface. A surface of the restraint may comprise a corresponding surface textured to engage the serrated surface of the brace actuator. The restraint may comprise a flexible release coupled thereto, the flexible release configured such that actuation of the flexible release causes the restraint to disengage the surface of the brace actuator. The brace may be positioned adjacent an end of the brace actuator. The brace may be fixedly coupled to the brace actuator. The brace may move substantially linearly toward the at least one flange. The brace may move pivotally toward the at least one flange.

Particular implementations may further comprise a brace actuator return channel adjacent a first flange of the at least one flange, the brace actuator return channel sized to receive a pull end of the brace actuator.

According to another aspect, a method of installing a retrofit electrical box assembly may comprise: inserting an electrical box having a front flange in a hole in a wall such that a rear surface of the front flange is in contact with a front surface of the wall; pulling a brace actuator extending adjacent a front side of the front flange away from the front flange to responsively pull a brace extending behind a rear surface of the front flange toward the rear surface of the front flange, the brace actuator securable with the electrical box against movement of the brace away from the front flange at a plurality of different points along the brace actuator; engaging an inside surface of the wall with the moveable brace; impinging the wall between the brace and the rear surface of the front flange; and restraining the brace in its engaged position to maintain the electrical box in its positional relationship with the wall.

Particular implementations may comprise one or more of the following: Engaging may further comprise releasing the brace from its engaged position against the wall by moving a restraint engaged with the brace actuator. Restraining may further comprise restraining the brace actuator with a restraint on the electrical box configured to engage the brace actuator to allow movement of the brace toward the front flange and restrict movement of the brace away from the front flange. Engaging the inside surface of the wall may comprise pivoting the moveable brace toward the front flange.

According to another aspect, a retrofit electrical box assembly may comprise an electrical box having at least two opposing side walls each comprising an inner surface and a front perimeter edge having a front flange having a rear surface, at least one brace comprising an engagement surface, the at least one brace moveably coupled to the inner surface of at least one of the at least two opposing side walls and positionable between a disengaged position and an engaged position such that at least a portion of at least one brace passes through at least one of the at least two opposing side walls when in the engaged position. The at least one brace may be configured to impinge a wall between the engagement surface of the at least one brace and the rear surface of the front flange when the one or more engagement wedges are in the engaged position.

Particular implementations may comprise one or more of the following: At least one of the engagement surface and a surface opposing the engagement surface of the brace may include an angled surface. The engagement surface may be configured to resist movement of the brace against a surface it comes in contact with.

According to another aspect, a method of installing a retrofit electrical box assembly may comprise: inserting an electrical box having a front flange in a hole in a wall such that a rear surface of the front flange is in contact with a front surface of the wall; sliding at least one brace along an inside surface of at least one of at least two opposing side walls such that at least a portion of the at least one brace passes through at least one of the at least two opposing side walls; engaging an inside surface of the wall with an engagement surface of the at least one brace; and impinging a wall between the engagement surface of at least one of the one or more engagement wedges and the rear surface of the front flange.

Particular implementations may include one or more of the following: Engaging the inside surface of the wall may comprise engaging the inside surface of the wall with one or more locking teeth of one or more engagement surfaces. Impinging a wall between the engagement surface may comprise releasably impinging the inside surface of the wall.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

A safety outlet will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended operation of a retrofit electrical box and/or assembly procedures for an electrical box will become apparent from this disclosure. Accordingly, for example, although particular implementing components are described, such components may comprise any shape, size, style, type, model, version, measurement, concentration, material, quantity, and/or the like as is known in the art for such safety outlets, consistent with the intended operation of a safety outlet.

There are a variety of retrofit electrical box implementations contemplated, disclosed herein and made clear from the present disclosure. Particular implementations include electrical boxes designed for use with various types of electrical devices. Particular implementations also include boxes that may be mounted within a hole in a wall. Particular implementations also include boxes that may allow a user to mount a box in a wall without attaching the box to a wall stud or other interior structural element. Particular implementations also include boxes that may be maintained in a substantially flush position relative to a wall. The various implementations may be manufactured using conventional procedures known to those of ordinary skill in the art as added to and improved upon through the procedures described herein.

It is desirable to improve the ease, convenience, and flexibility with which an electrical box may be mounted within a wall as compared to conventional methods, by providing moveable clamping members that permit an electrical box to be placed within a pre-formed hole in an existing wall and then easily secured without the requirement of power tools. In cases where a building has long since been built, the disclosed device may be particularly convenient.

There are many aspects of an electrical box disclosed herein, of which one, a plurality, or all aspects may be used in any particular implementation.

Figure 1:
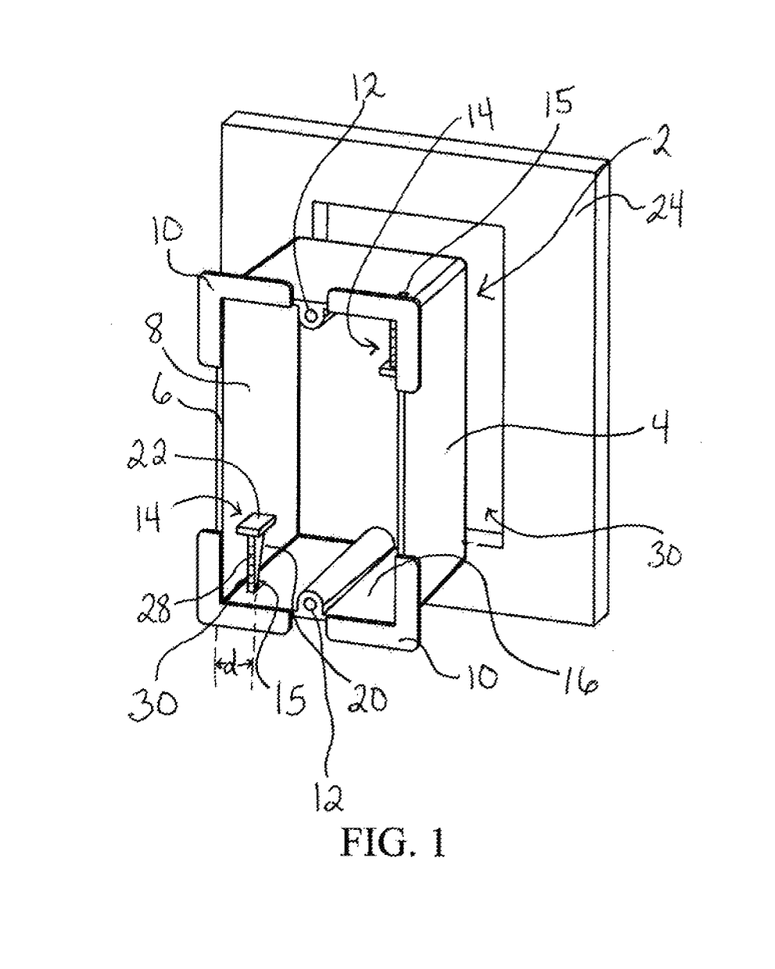
FIG. 1 is perspective view of an electrical box assembly of a first implementation prior to installation in a wall.
Figure 2:
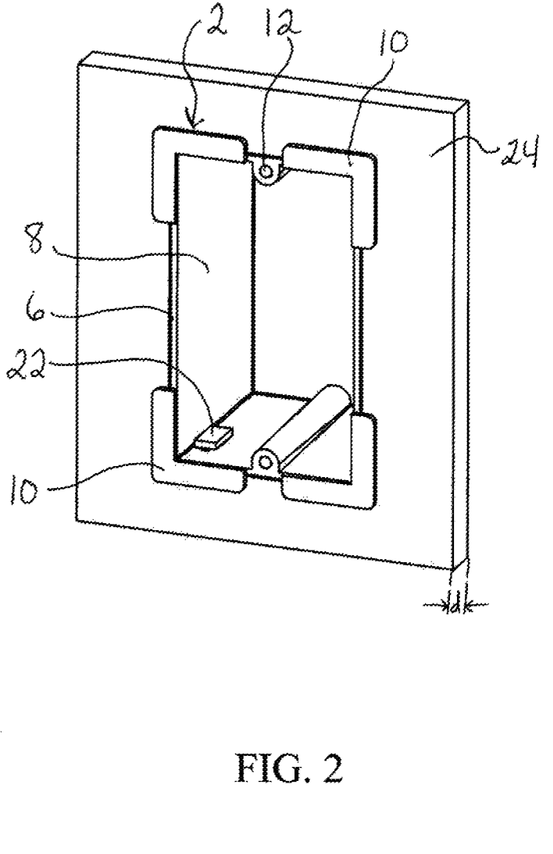
FIG. 2 is a perspective view of the electrical box assembly of FIG. 1 after installation in the wall.

FIGS. 1 and 2 illustrate perspective views of a non-limiting example of a first implementation of a quick-installation retrofit electrical box assembly 2 comprising an electrical box 4 comprising a front opening 6 having a peripheral wall 8 and at least one front flange 10 extending from the peripheral wall 8. Two box mounting screw bosses 12, known in the art, are included in the electrical box 4. One or more brace 14 extends through at least one opening 15 in a side 16, 18 of the peripheral wall 8 of the electrical box 4. In particular implementations, two or more braces 14 extend through at least opposing sides 16, 18 of the peripheral wall 8 of the electrical box 4. The braces 14 may comprise at least one angled edge 20 at an angle other than 90 degrees with respect to the substantially planar cap 22 of the braces 14. The angled edge 20 causes the brace 14 to become closer to the wall surface material 24 the farther the brace 14 is pushed through the opening 15 in the side 16, 18 of the peripheral wall 8. So long as the distance "d" between the front flange 10 and the brace 14 is less than the thickness of the wall surface material 24, pressing the brace 14 through the opening will cause the wall surface material 24 to be impinged between the brace 14 and the front flange 10, thereby securing the box in place on the wall surface material.

In particular implementations, the distance "d" is substantially equal to the wall surface material 24 thickness so that the brace 14 is pressed almost flat with the side 16, 18 of the peripheral wall 8. Alternatively, the brace 14 would only be pushed partially through the peripheral wall 8 until the box was securely attached to the wall surface material 24. The cap 22 of the brace 14 may be textured in some implementations. The angled edge 20 or opposing edge 28 may be oriented toward the wall surface material 24. The edge 20 or 28 oriented toward the wall surface material 24 may comprise a textured, serrated or otherwise gripping surface 30 configured to grip the interior surface of the wall surface material 24. Additionally, the other edge 20 or 28 oriented away from the wall surface material 24 may also comprise a textured or otherwise gripping, such as with periodic grooves, surface to help to maintain the brace 14 in its position when pushed through the opening 15. By providing gripping surfaces on the brace 14, the sliding brace 14 may be moved into an engaged position (FIG. 2) with respect to the wall surface material 24, but resists the disengagement of the sliding brace 14 from the interior surface of the wall surface material, once engaged.

A user desiring to mount a retrofit electrical box assembly 2 within a wall may first cut a hole 30 in a wall surface material 24 slightly larger than the outer surface of the perimeter wall 8. A user may next pull any necessary wires from within the wall into the electrical box 4 as is conventionally done. Next, a user may place the electrical box 4 within the hole, rear end first. With the electrical box 4 placed within the hole 30 in the wall surface material 24, a user may align the box 4 so that the front flange 10 is located along a front surface of the wall, just outside of the hole 30 in the wall. With the electrical box 4 so positioned, a user may thereafter depress the cap 22 of the one or more braces 14 so that an engagement surface of the brace 14 engages the wall, thereby impinging the wall surface material 24 between the engagement surface of the brace 14 and the rear surface of the front flange 10. With the wall surface material 24 impinged between the engagement surface of the brace 14 and the rear surface of the front flange 10, the electrical box 4 is fixed in position with respect to the wall, and ready for mounting therein one or more electrical devices. A user may wish to complete the installation by finishing the front surface of the wall so that the space between the edge of the hole 30 and the outer surface of the electrical box is not visible.

Figure 3:
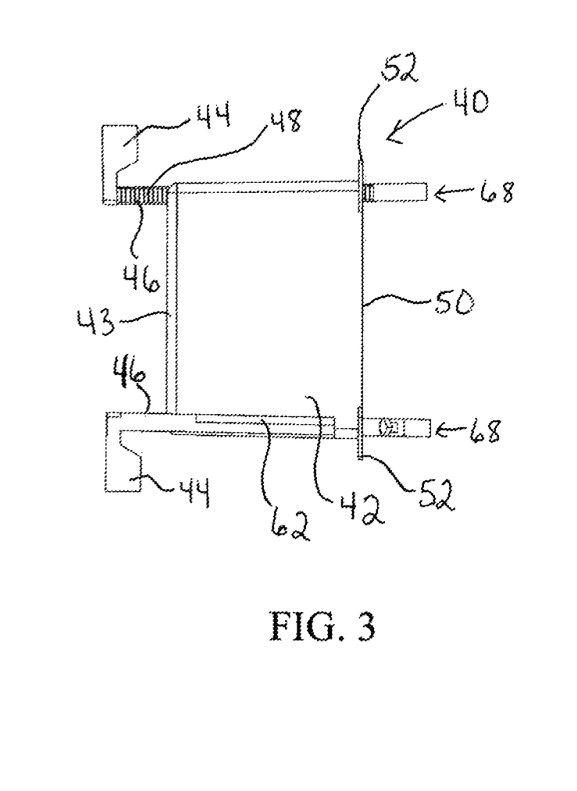
FIG. 3 is a side view of an electrical box assembly of a second implementation with sliding braces.

FIGS. 3-10 illustrate other non-limiting examples of implementations of a retrofit electrical box assembly 40. Like the previous implementation of FIGS. 1 and 2, the electrical box assembly 40, as illustrated in FIG. 3, comprises an electrical box 42, an open front end 50, one or more flanges 52 extending from the front edge of the front end 50, box mounting screw bosses 54 and other structures typical to conventional electrical boxes. Like the previous implementation, the electrical box 42 mounts to a wall surface material 64 (FIG. 4) by impinging the wall surface material 64 between the front flange 52 of the electrical box 42 and the one or more braces 44. Different from the implementation illustrated in FIGS. 1 and 2, however, the implementations illustrated in FIGS. 3-10 comprise a different brace structure and impingement movement.

FIG. 3 is a side view of the electrical box assembly 40 showing at least one brace 44 coupled to the electrical box 42, and in this particular implementation each integrally formed with, a corresponding linear brace actuator 46. The linear brace actuator 46 comprises an engagement surface 48 configured to resist movement of the brace 44 away from the front end 50 of the electrical box 42. In the particular implementations illustrated in FIGS. 3-10, the linear brace actuator 46 comprises a serrated engagement surface 48 similar to that found on what is commonly known as a "zip tie" in the electrical contracting industry. As illustrated in the cross-sectional view of FIG. 8, the serrated engagement surface 48 of the linear brace actuator 46 is engaged by corresponding structures on restraint 56 so that the angled serrations 58 of the engagement surface 48 can easily be drawn through the restraint 56 in a direction toward the front 50 of the box 42, but strongly resist movement toward the rear of the box 42.

Figure 16:
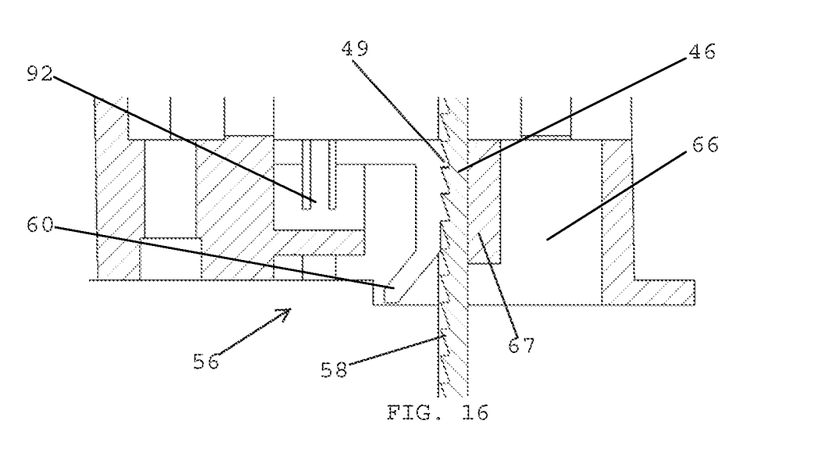
FIG. 16 is a partial cross-sectional view of a restraint and a brace actuator.

As shown in FIG. 16, an implementation of the restraint 56 comprises a release tab 60, a divider 67 adjacent to the release tab, and a channel 66 adjacent the divider 67 opposite release tab 60. In one particular implementation, release tab 60 is typically biased against divider 67 such than unless actuate, the release tab 60 is at least partially in direct contact with divider 67. In another implementation, release tab 60 is biased towards divider 67, but an opening or slot is formed between the release tab 60 and divider 67 even when release tab 60 is not actuated. The opening or slot is typically sized to allow passage of the brace actuator 46 through the opening and allow for engagement or other contact between the release tab 60 and the engaging surface 48 of brace actuator 46, and between the divider 67 and brace actuator 46. In an implementation, restraint 56 or the front flange 52 further comprises a tension flange 92 that helps keep the box snug or tight between tooth engagements.

Figure 8:
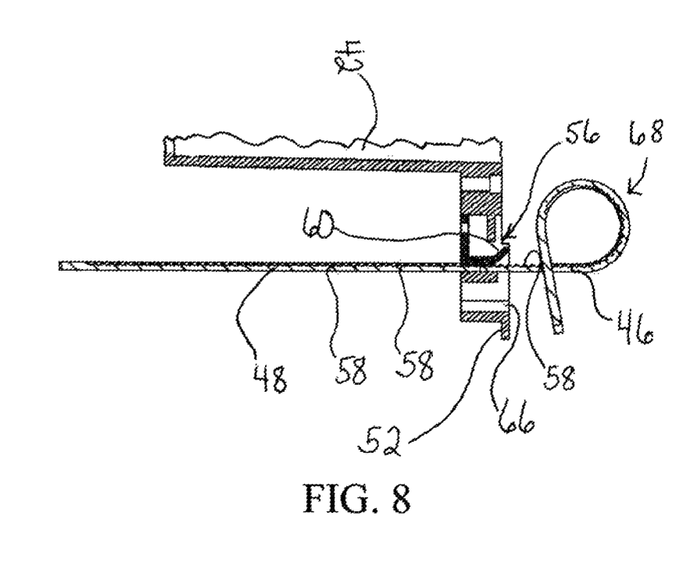
FIG. 8 is a cross-sectional view of the electrical box assembly of FIG. 6 installed in the wall, the cross-section taken along section line 8-8 of FIG. 6.

For the particular implementation illustrated in FIG. 8, the restraint 56 comprises a release tab 60 which when pushed away from the linear brace actuator 46 causes the restraint 56 to disengage from the engagement surface 48 of the linear brace actuator 46 so that the box 42 can be released from engagement with the wall. As illustrated in FIG. 16, an implementation of release tab 60 comprises a plurality of teeth 49 configured to engage with the angled serrations 58 of the brace actuator 46. In a particular implementation, the teeth 49 of the release tab 60 and the angled serrations 58 of the brace actuator are particularly configured to allow linear movement of the brace actuator 58 between the release tab 60 and the divider 67 in only one direction, typically outward from the electrical box 42. In such an implementation, as illustrated in FIG. 16, linear inward movement of the brace actuator 58 is restricted due to the engagement between the teeth 49 and the angled serrations 58 of the brace actuator 46 unless the release tab 60 is actuated.

Selectively releasable tab 60 is typically actuated by moving the tab 60 away from the divider 67 and/or the brace actuator 46. This movement may be accomplished by pushing or pulling the releasable tab 60 with a finger, tool, or various other mechanisms to temporarily overcome the bias of the tab 60 against the divider 67. Actuation of the selectively releasable tab 60 enlarges the opening between the tab 60 and the divider 67, thus allowing for passage of the brace actuator 46 through the opening between the tab 60 and the divider 67, The brace 44, through manipulation of the brace actuator 46, slidably couples with the electrical box 42 such that the brace 44 can move toward the front 50 of the box 42. Although the particular implementations illustrated in FIGS. 3-10 include tracks 62, it should be noted that those tracks 62 are optional and may be excluded in many particular implementations. Provided the brace actuator 46 as some degree of rigidity and includes a guide, such as the restraint 56, to maintain the relative orientation of the brace 44 as the linear brace actuator 46 is pulled toward the front 50 of the box 42. Additionally, although the braces 44 used in any of the particular implementations are shown to have a particular shape or structure, it should be noted that no particular shape or structure is required or intended to be implied by the use of these non-limiting examples. For example, it is specifically contemplated that although the particular braces shown in FIGS. 3-10 have only a narrow edge resting against the back surface of the wall surface material 64, a much wider foot may be included on the brace 44 so that the brace 44 finds more stable engagement with the wall surface material 64.

Figure 12:
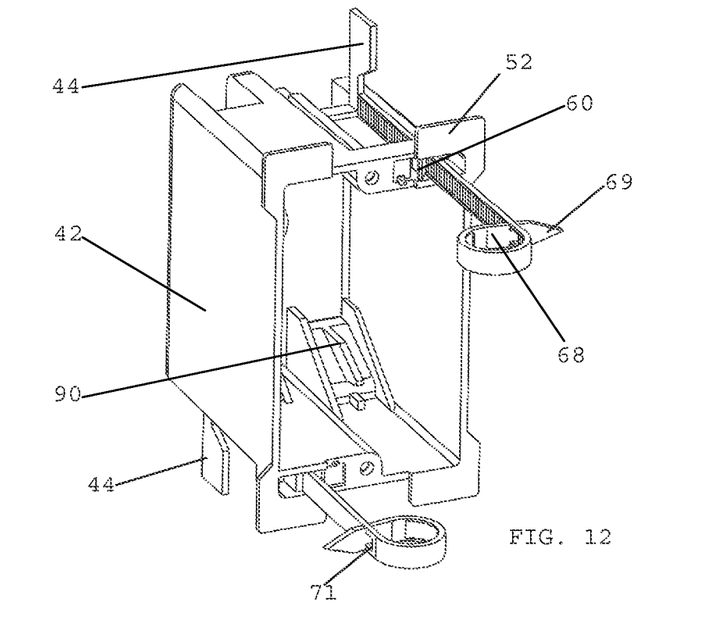
FIG. 12 is a perspective view of an implementation of an electrical box assembly prior to installation into a wall.
Figure 13:
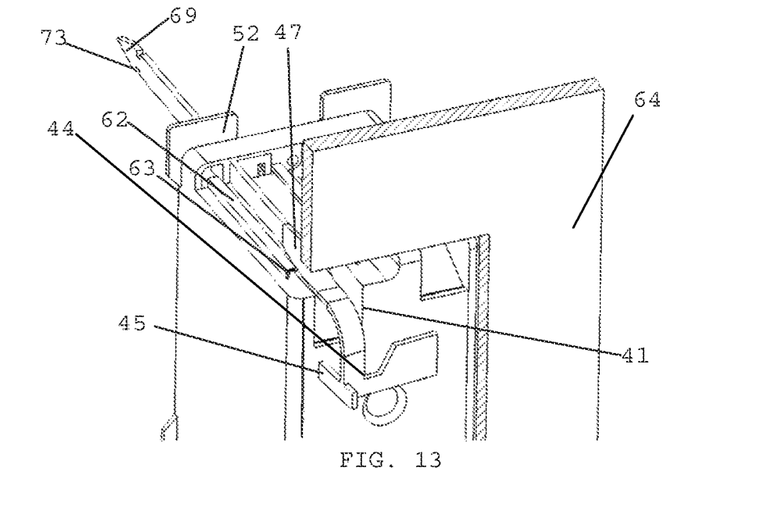
FIG. 13 is a rear perspective view of the electrical box assembly of FIG. 12 being installed into a cross-sectioned wall.
Figure 14:
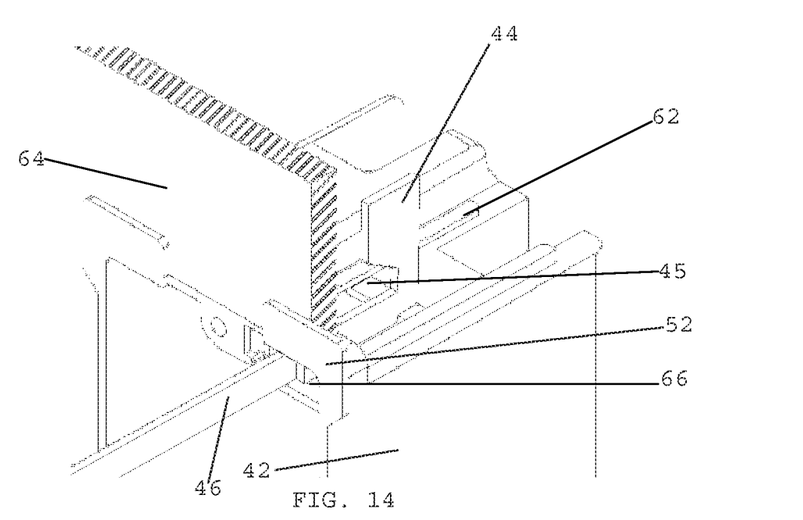
FIG. 14 is a front perspective view of the electrical box assembly of FIG. 12 being installed into a cross-sectioned wall.
Figure 15:
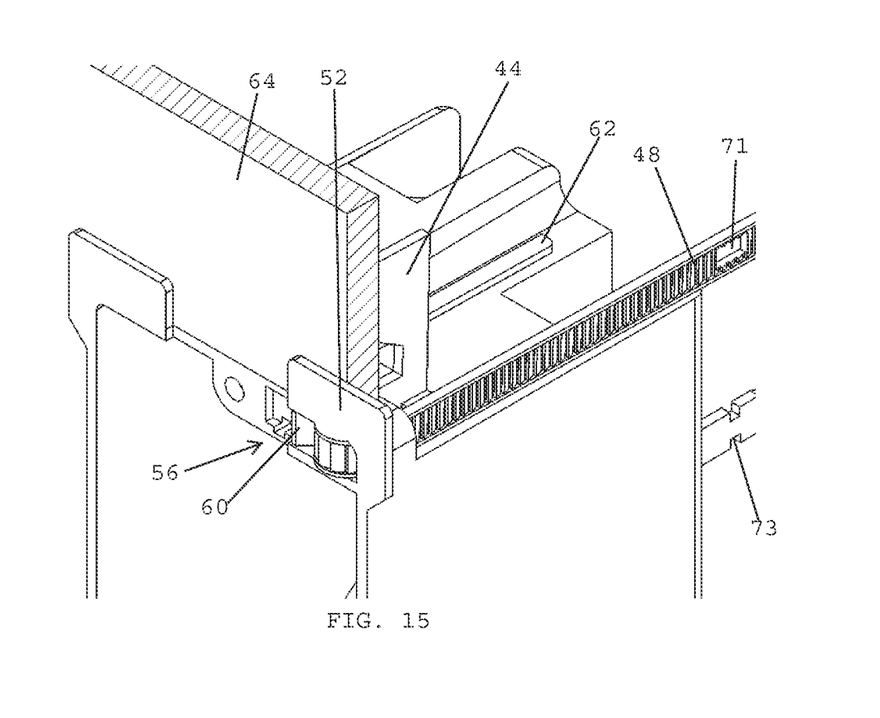
FIG. 15 is a front perspective view of the electrical box assembly of FIG. 12 installed into a cross-sectioned wall with the brace actuator inserted into a channel.

As shown in FIGS. 4-6, 9, and 13-15 and described above, an implementation of electrical box 42 comprises tracks 62 on at least one side wall. Tracks 62 are positioned to extend at least partially between the back wall and the open front of electrical box 42, and are typically aligned with a restraint 56. Alignment and position of tracks 62 provide a guide for the brace 44 as the brace actuator 46 is pulled through restraint 56. In a particular implementation, a rail 45 is coupled to an end of brace 44, the rail 45 sized to slide between tracks 62. In a further implementations, as shown in FIG. 13, each track 62 may comprise a slot 63 or other channel sized to allow passage of rail 45 through channel 63. Tracks 62 may mirror each other such that each track 62 comprises a slot 63 facing the slot 63 of the opposing track. Such a configuration allows for opposing ends of rail 45 to engage with and slide through slots 63 of tracks 62 as the brace actuator 46 is pulled through restraint 56. In still another implementation, brace actuator 46 may further comprise a twist 47 molded into the shape of the brace actuator 46. Molding the brace actuator 46 with a twist 47 may allow the brace 44 to align automatically and also fit easier behind the box 42 when pushed back, as shown in FIG. 13. As shown in FIG. 13, electrical box 42 may further comprise an indent 41 or similar feature sized or otherwise configured to allow the brace 44 to snap or fit into the indent 41 for shipping, packaging, or storage. Implementations of the box may further comprise at least one NM clamp 90, as shown in FIG. 12.

Figure 9:
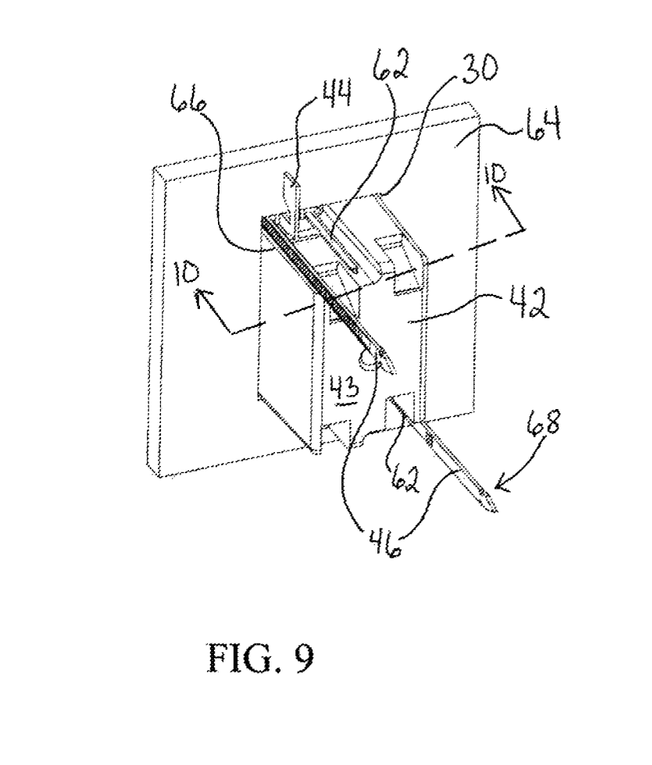
FIG. 9 is a rear perspective view of the electrical box assembly of FIG. 3 with the linear brace actuators stored.
Figure 10:
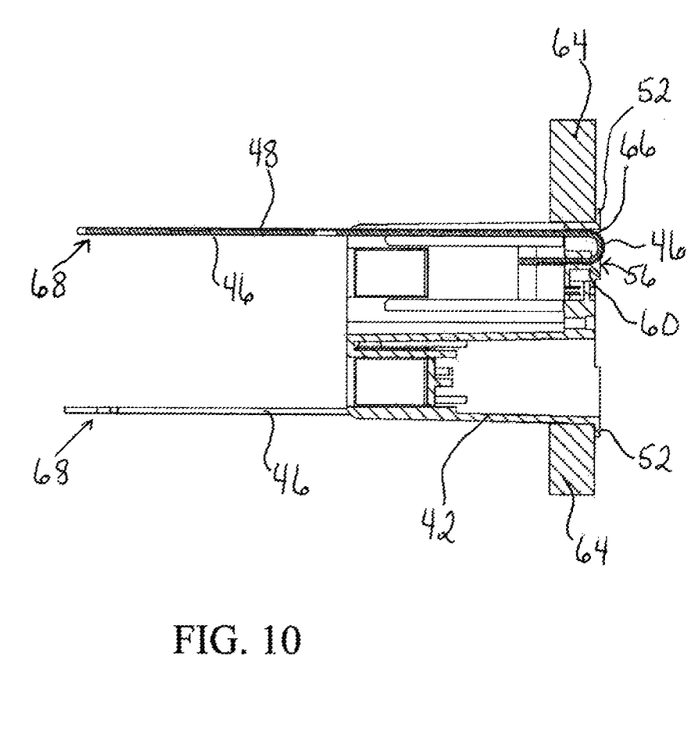
FIG. 10 is a cross-sectional view of the electrical box assembly of FIG. 9, the cross-section taken along section line 10-10 of FIG. 9.

FIGS. 9 and 10 illustrate that after the brace 44 is pulled all the way to the inner surface of the wall surface material 64 and the electrical box 42 is securely coupled to the wall, the linear brace actuators 46 may be fed back through channels 66 (see also FIGS. 4, 8, and 14-16) so that the ends of the brace actuators 46 are stored within the wall. If the electrical box 42 ever needs to be released from the wall or tightened on the wall, the restraint 56 may be pressed to release the brace 44 and the linear brace actuator 46 can be pulled out from storage within the wall and again used to manipulate the brace 44 behind the wall with respect to the electrical box 42 and wall surface material 64. In the particular implementation illustrated in FIGS. 3-10, the linear brace actuators 46 include a pull end 68 formed by looping the linear brace actuator 46 and threading it through itself to form a pull loop. Alternate implementations may comprise a fixed pull loop or may include no loop at all. As shown in FIGS. 12 and 13, an implementation of brace actuator 46 may comprise at least one notch 73 on a terminating end 69 of the brace actuator 46 opposite the brace 44. Brace actuator 46 may also comprise a hole 71 extending through the brace actuator 46, the hole 71 size to allow passage of the terminating end 69 through the hole 71. Once the terminating end 69 is inserted through the hole 71, the notches 73 on the brace actuator 46 may engage with the borders or boundaries of hole 71 to temporarily lock or hole the terminating end 69 within the hole 71. This temporary lock forms a pull end 68 or loop that allows a user to more easily pull the brace 44 to impinge the wall 64 between the brace 44 and the front flange 52. In a particular implementation, the terminating end 69 comprises a point to allow for easier passage through the hole 71.

Although the particular implementation illustrated in FIGS. 9 and 10 demonstrates that the linear brace actuator 46 may be stored within the wall, in other particular implementations the linear brace actuator 46 may be optionally cut or broken off and not stored for future use. In a particular implementation, the linear brace actuator 46 is an integral molded plastic component formed of polyvinylchloride (PVC) or other strong but flexible material which is readily cut by a razor blade or utility knife. As previously noted, in some implementations, the brace actuator 46 may be molded with a twist 47.

Figure 4:
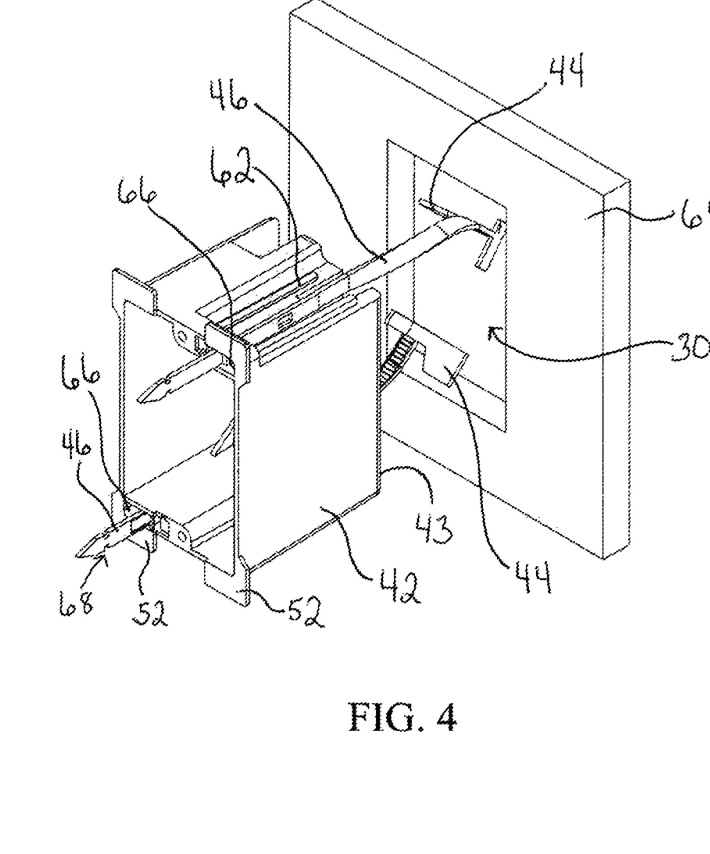
FIG. 4 is a front perspective view of the electrical box assembly of FIG. 3 being installed into a wall.
Figure 5:
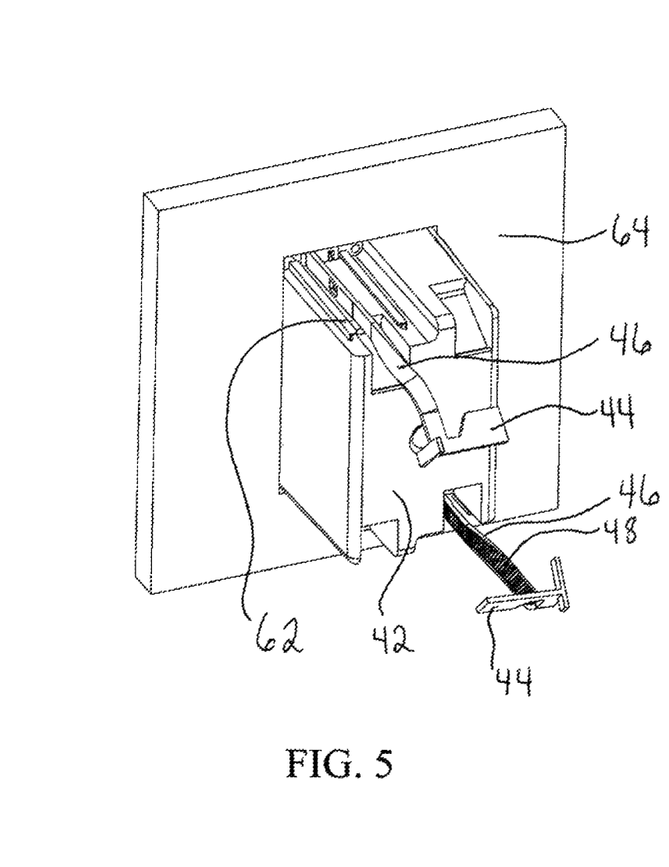
FIG. 5 is a rear perspective view of the electrical box assembly of FIG. 3 being installed into the wall.
Figure 6:
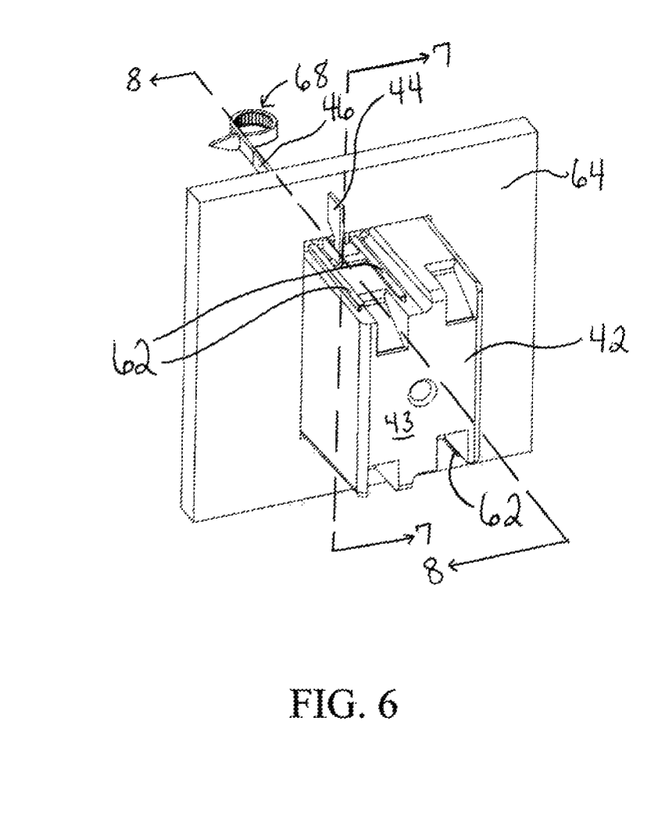
FIG. 6 is rear perspective view of the electrical box assembly of FIG. 3 after the braces are pulled toward the wall.
Figure 7:
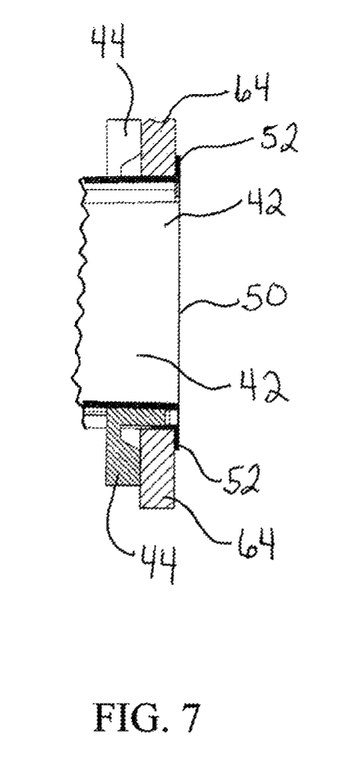
FIG. 7 is a cross-sectional view of the electrical box assembly of FIG. 6 installed in the wall, the cross-section taken along section line 7-7 of FIG. 6.

A user desiring to mount a retrofit electrical box assembly 40 within a wall may first cut a hole 30 in a wall surface material 64 slightly larger than the outer surface of the perimeter wall of the electrical box 42. A user may next pull any necessary wires from within the wall into the electrical box 42 as is conventionally done through openings in the electrical box 42. Next, a user may place the electrical box 42 within the hole 30, rear end first (FIGS. 4 and 5). For this particular implementation, the braces 44 will need to be extended beyond the rear end 43 of the electrical box 42 so that the one or more braces 44 can be bent down so they will fit into the hole 30. Because the brace actuators 46 are formed of strong but flexible material with a degree of rigidity, like PVC or other suitable plastic, the general orientation of the braces 44 will be corrected to an upright position against the wall surface material 64 (FIG. 6) as they are pulled toward the wall. If they are pulled adjacent to the side wall of the electrical box 42, they will interfere with insertion of the electrical box 42 into the hole. With the electrical box 42 placed within the hole 30 in the wall surface material 64, a user may align the box 42 so that the front flange 52 is located along a front surface of the wall surface material 64, just outside of the hole 30 in the wall (FIGS. 5 and 8). With the electrical box 42 so positioned, a user may thereafter pull on the linear brace actuator 46 associated with each brace 44 so that each brace 44 engages the wall, thereby impinging the wall surface material 64 between the brace 44 and the rear surface of the front flange 52 (FIGS. 6 and 7). With the wall surface material 64 impinged between the brace 14 and the rear surface of the front flange 52, the electrical box 42 is fixed in position with respect to the wall, and ready for mounting therein one or more electrical devices. The pull ends 68 of the linear brace actuators 46 may be tucked back into the wall along channels 66 adjacent the front flanges 52 (FIGS. 9 and 10).

Figure 11:
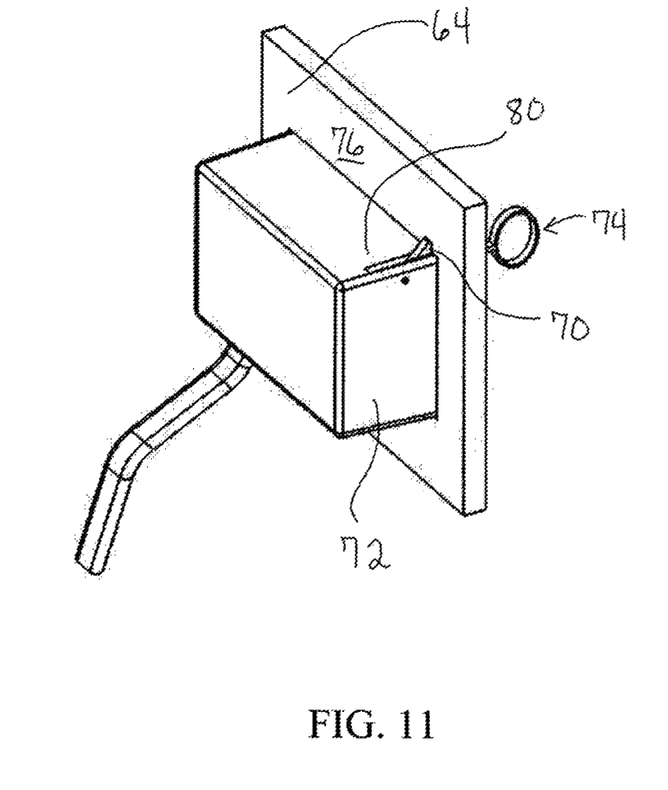
FIG. 11 is a third particular implementation of an electrical box assembly.

FIG. 11 illustrates a perspective rear view of an electrical box of a third implementation. In contrast to the previous implementations, this particular implementation comprises a pivoting brace 70 configuration to impinge a wall surface material 64 between a rear surface of a front flange (not shown) of the electrical box 72 and the pivoting brace 70. Although the front flange is obscured in FIG. 11, the front flange of the second implementation is structurally identical to that disclosed with respect to the first implementation.

Accordingly, installation of the electrical box according to the third implementation may, in many respects, be similar to the installation of the electrical box of the first or second implementation. A user desiring to mount the electrical box 72 within a wall may first cut a hole in a wall slightly larger than the outer surface of the perimeter wall. A user may next pull into the electrical box opening any necessary wires from within the wall. Next, a user my place the electrical box 72 within the hole, rear edge first. With the electrical box placed within the hole in the wall surface material 64, a user may align the box so that the front flange (not shown, but substantially the same as the front flange in the first and second implementations) is located along a front surface of the wall, just outside of the hole in the wall. With the electrical box 72 so positioned, a user may thereafter pull towards the user the one or more brace actuators 74, which are in mechanical cooperation with one or more moveable braces 70. Different from the moveable braces of the implementation shown in FIGS. 3-10, the braces 70 of the implementation shown in FIG. 11 pivots toward the rear surface 76 of the wall surface material 64 to engage the wall on a pivot point. The previous two implementations each moved linearly to engage the wall. The first moving linearly almost parallel to the wall, the second moving linearly perpendicularly to the wall. By pulling on the brace actuator 74, the moveable brace 70 moves from a disengaged position to an engaged position against the interior surface 76 of the wall surface material 64. In particular, when the moveable brace 70 is in a disengaged position, the moveable brace 70 does not contact an interior surface of the wall and retracts to near an external surface 80 of the box 72 to allow for placement of the box 72 into the hole in the wall surface material 64. In particular implementations, the brace actuator 74 of this design as well may be removable such that when once the movable brace 70 is moved to its engaged position, the brace actuator 74 may be cut off, snapped off or otherwise removed. In particular implementations, the moveable brace may comprise one or more incremental positioning points and the electrical box 72 may comprise a restraint similar to that of the implementation of FIGS. 3-10. Those structures will not be discussed again here as the same operation and structure may be used interchangeably for this implementation. As with the previous implementation, use of a serrated or similar structure enables a plurality of engaged positions along which the moveable brace can lock into position.

Therefore, with the electrical box 72 positioned within the hole in the wall, a user may engage one or more moveable braces 70 (via one or more brace actuators 74) so that the engagement surface of the one or more moveable braces 70 engages the interior surface 76 of the wall, thereby impinging the wall between the brace 70 and the rear surface of the front flange. With the wall impinged between the moveable brace (s) 70 and the rear surface of the front flange, the electrical box 72 is fixed in position with respect to the wall, and ready for mounting therein one or more electrical devices In an implementation, the electrical box 42 may also be adjusted even after mounting to a wall, but also before mounting to a wall. As previously described, release tab 60 may be moved to release the engagement between release tab 60 and the angled serrations 58 of the brace actuator 46. Once released, and if unscrewed, the brace actuator 46 may be pulled through the restraint 56 in an inwardly direction and the electrical box 42 may be adjusted or moved to a new location.

The implementations listed here, and many others, will become readily apparent to those of ordinary skill in the art from this disclosure. Those of ordinary skill in the art will readily understand the versatility with which this disclosure may be applied.

Implementations of electrical box, and implementing components, may be constructed of a wide variety of materials known in the art for constructing electrical box. For example, the components may be formed of: metals; polymers such as thermoplastics (such as ABS, Fluoropolymers, Polyacetal, Polyamide; Polycarbonate, Polyethylene, Polysulfone, and/ or the like); thermosets (such as Epoxy, Phenolic Resin, Polyimide, Polyurethane, Silicone, and/or the like), any combination thereof, and/or other like materials. Those of ordinary skill in the art will readily be able to select appropriate materials and manufacture these products from the disclosures provided herein.

Some components defining electrical boxes may be manufactured simultaneously and integrally joined with one another, while other components may be pre-manufactured or manufactured separately and then assembled with the integral components. Various implementations may be manufactured using conventional procedures as added to and improved upon through the principles described here. Components manufactured separately may then be coupled or removably coupled with the other integral components in any manner.

It will be understood that implementations are not limited to the specific components disclosed herein, as virtually any components consistent with the intended operation of a method and/or system implementation for electrical box may be utilized. Accordingly, for example, although particular component examples may be disclosed, such components may comprise any shape, size, style, type, model, version, class, grade, measurement, concentration, material, weight, quantity, and/or the like consistent with the intended operation of a method and/or system implementation for an electrical box may be used.

In places where the description above refers to particular implementations of an electrical box, it should be readily apparent that a number of modifications may be made without departing from the spirit thereof and that these implementations may be applied to other retrofit boxes. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A retrofit electrical box assembly, comprising:
    an electrical box comprising at least one side wall, a back wall coupled to the at least one side wall, and at least one front flange coupled to the at least one side wall opposite the back wall;
    a restraint coupled to the at least one side wall and comprising a selectively releaseable tab, a divider adjacent to the selectively releaseable tab, a first opening between the selectively releaseable tab and the divider, and a second opening opposite the first opening;
    at least one brace coupled to a brace actuator, wherein the brace actuator is configured to engage with the selectively releaseable tab at any of a plurality of locations on the brace actuator when the brace actuator is pulled through the first opening such that the brace actuator disengages with the selectively releaseable tab upon actuation of the selectively releasable tab;
    wherein when the electrical box is installed on a wall surface material, movement of the brace actuator away from the restraint after the brace actuator is inserted into the first opening moves the at least one brace toward the at least one flange and impinges a wall surface material between the at least one movable brace and the front flange.

2. The retrofit electrical box assembly of claim 1, wherein the brace actuator comprises a flexible brace actuator bendable to be inserted into the second opening after the wall surface material has been impinged between the at least one movable brace and the front flange.

3. The retrofit electrical box assembly of claim 2, wherein the at least one side wall further comprises tracks configured to guide the brace toward the flange when the brace actuator is pulled through the first opening.

4. The retrofit electrical box assembly of claim 3, wherein the brace further comprises a rail sized to fit between the tracks.

5. The retrofit electrical box assembly of claim 4, wherein each track comprises a slot facing the slot of the opposing track and wherein opposing ends of the rail slidably engage within the slots of the tracks.

6. The retrofit electrical box assembly of claim 1, wherein the selectively releasable tab is biased towards divider and further comprises at least one tooth on a side adjacent to the divider, the at least one tooth configured to engage with angled serrations of the brace actuator, and wherein actuation of the selectively releasable tab comprises moving the selectively releasable tab away from the divider.

7. The retrofit electrical box assembly of claim 6, wherein the at least one tooth and the angled serrations are configured to allow the brace actuator to move linearly outward from the electrical box when the brace actuator is pulled through the first opening between the divider and the release tab, and prevent the brace actuator from moving linearly inward to the electrical box between the release tab and the divider unless the releasable tab is actuated.

8. The retrofit electrical box assembly of claim 1, wherein the brace actuator further comprises a hole extending through the brace actuator and two notches proximate a terminating end of the brace actuator, wherein the terminating end is configured to fit through the hole and the notches are configured to engage with borders of the hole when the terminating end is inserted through hole to form a loop.

9. The retrofit electrical box assembly of claim 8, wherein the brace actuator further comprises a molded twist.

10. The retrofit electrical box assembly of claim 9, wherein the back wall comprises a brace receiver sized to hold the brace.

11. The retrofit electrical box assembly of claim 1, further comprising a tension flange on the at least one flange.

12. The retrofit electrical box assembly of claim 1, wherein the at least one side wall comprises at least two side walls and the at least one front flange comprise two flanges coupled each of the at least two side walls.

13. A method of adjusting a retrofit electrical box assembly mounted on a wall, comprising:
   disengaging a release tab from a brace actuator, the brace actuator extending through a first opening adjacent to the release tab on a restraint coupled to a front flange of an electrical box;
   pushing the brace actuator to responsively push a brace away from a wall impinged between the front flange and the brace;
   moving the electrical box to an adjusted position;
   pulling the brace actuator through the first opening and away from a front surface of the front flange to responsively pull the brace extending behind the rear surface of the front flange, the brace actuator securable with the release tab to prevent movement of the brace away from the front flange;
   impinging the wall between the brace and the rear surface of the front flange;
   and restraining, with the release tab, the brace in its engaged position to maintain impingement of the wall between the brace and the rear surface of the front flange.

14. The method of claim 13, further comprising inserting the brace actuator into a brace actuator return channel adjacent to the front flange after impinging the wall between the brace and the rear surface of the front flange.

15. The method of claim 14, wherein pushing the brace actuator to responsively push the brace away from the wall comprises pushing the brace actuator to responsively push the brace between two tracks and away from the wall, the brace comprising rails size to fit between the two tracks.

16. The method of claim 15, wherein disengaging the release tab from the brace actuator comprises moving the release tab biased against the brace actuator away from the brace actuator.

17. The method of claim 16, further comprising forming a loop on a terminating end of the brace actuator by threading the terminating end of the brace actuator through a hole on the brace actuator.

\* \* \* \* \*